Feb. 19, 1946. P. O. KAISLER 2,395,277
TOY
Filed Jan. 29, 1945
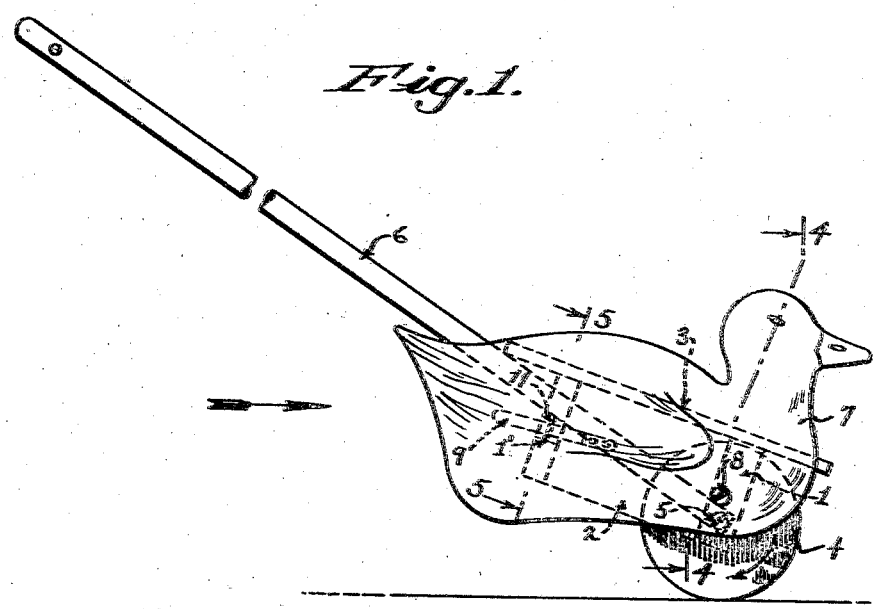
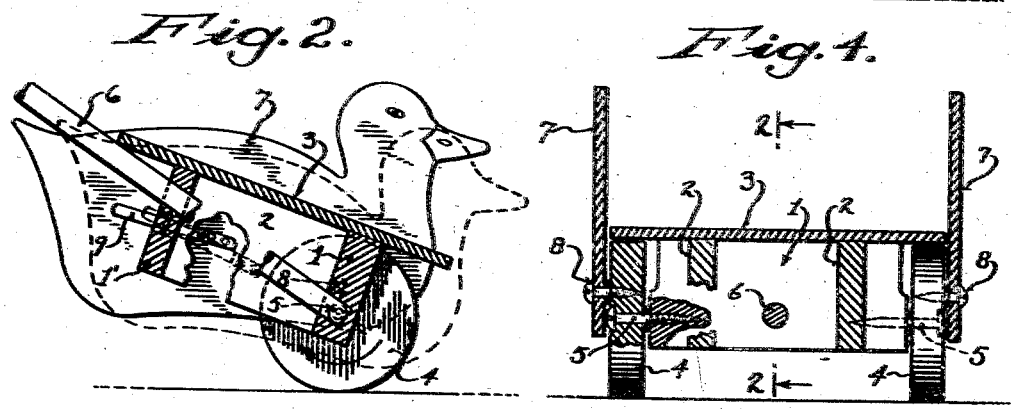
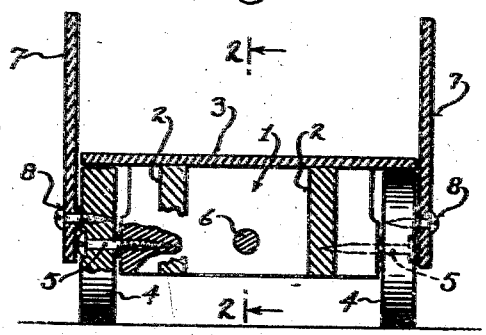
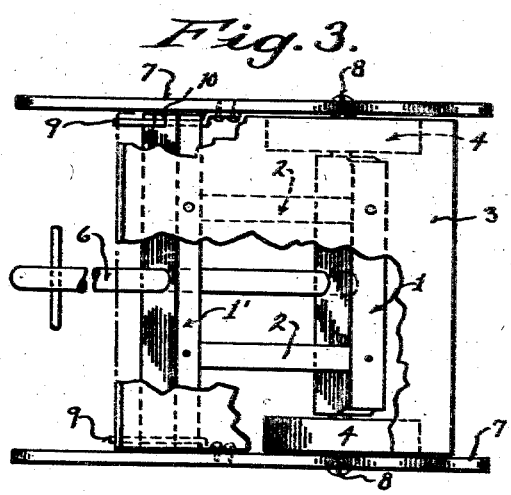
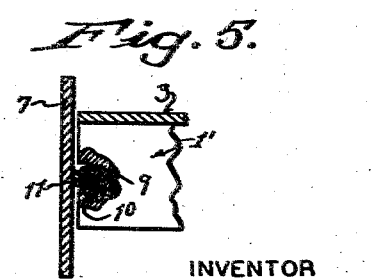
INVENTOR
PETER O. KAISLER
BY
ATTORNEYS Patented Feb. 19, 1946

2,395,277

UNITED STATES PATENT OFFICE 2,395,277

TOY

Peter O. Kaisler, Milwaukee, Wis.

Application January 29, 1945, Serial No. 575,025

2 Claims. (Cl. 280—60)

My invention refers to toys, and has for its object to provide a two wheeled cart, drawn by a hand tongue, and having oscillatory side-wings in fanciful form, such as a duck, or other figure pleasing to juveniles, the seat of the cart serving as a conveyance for small children.

Another object of my invention is to provide the side-wing figures attached to the wheels of the cart by a crank pin connection at one end of the figures to the cart wheels, which are independently rotatable, the figures being connected at their opposite ends by pitman rods, reciprocative in couplings, carried by the cart frame.

With the above and other minor objects in view, the invention consists in certain peculiarities of construction and combination of parts, as will be hereinafter fully set forth with reference to the accompanying drawing, and subsequently claimed.

In the drawing:

Figure 1 represents a side elevation of a toy cart embodying the features of my invention.

Figure 2, a vertical sectional view of the cart, the section being indicated by line 2—2 of Figure 4.

Figure 3, a plan view of said cart, with parts broken away to more clearly illustrate structural features.

Figure 4, a cross-section of the toy, the section being indicated by line 4—4 of Figure 1, and Figure 5, a fragmentary sectional view illustrating the pitman connection between the side-wings and cart frame, the section being indicated by line 5—5 of Figure 1.

Referring by characters to the drawing, the cart comprises a rectangular frame, having transversely disposed front and rear blocks 1, 1', respectively. The blocks are connected by spaced longitudinally disposed strips 2, 2 and the said cart is completed by a seat 3, secured to the frame.

The front frame block 1 has mounted upon its ends, a pair of wheels, 4, 4, which wheels are pivoted to the block ends by screw studs 5.

The cart frame has secured thereto an angularly positioned tongue 6, the bottom end of which passes through the pair of blocks 1, 1', to which it is secured.

In order to add a life-like feature to the toy, I provide a pair of oscillatory side-wings 7 in the form of ducks, which are positioned adjacent the side edges of the seat and arranged to oscillate or simulate the walking movement of ducks.

In view of this fact, the front portion of the duck side walls are secured to the wheels 4 by crank pins 8, which crank pins are in the form of screws.

The rear or tail portion of the side-wings have rigidly secured thereto, and slightly offset, pitman rods 9, 9, which pitman rods extend through notches 10 in the ends of the rear blocks 1', and said rods are loosely confined in the notches by staples 11, that serve as couplings for the rods, whereby the side-wings are held in place, and due to the rotation of the wheels and reciprocative pitman rods, develop an oscillating movement when the cart is in motion, which movement may be either synchronous or alternating, due to the fact that the wheels are independently pivoted.

It is manifest that the ornamental side-wings may take the form of any fanciful figure.

While I have shown and described one exemplification of my invention, minutely as to detail, it is understood that I may vary the structural features within the scope of the claims.

I claim:

1. A toy comprising a cart, including a frame, having transversely disposed spaced blocks, a seat mounted thereon, wheels pivoted to the ends of one of said frame blocks, side-wing figures, crank pins connecting the side-wings to the wheels adjacent end portions of the figures, pitman rods secured to the opposite end portions of the figures, and guide couplings carried by the other frame block for the pitman rods.

2. A toy comprising a frame, a seat mounted thereon, wheels independently pivoted to the frame, oscillatory side-wings extending above the seat, crank pins connecting the side-wings and wheels, pitman rods secured to the side-wings, couplings connecting the pitman rods and frame, and a traction tongue extending from the frame.

PETER O. KAISLER.